(12) United States Patent
Crawford

(10) Patent No.: US 6,726,228 B2
(45) Date of Patent: Apr. 27, 2004

(54) STEERING WHEEL ALIGNMENT SYSTEM

(75) Inventor: Ray Crawford, Odon, IN (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/082,467

(22) Filed: Feb. 25, 2002

(65) Prior Publication Data

US 2003/0159303 A1 Aug. 28, 2003

(51) Int. Cl.⁷ .................................................. B62D 1/00
(52) U.S. Cl. .................. 280/86.75; 280/771; 403/359.1
(58) Field of Search ............................... 280/771, 93.5, 280/86.75, 86.751, 86.752, 86.753, 86.754, 86.756, 86.757, 86.758; 403/359.1, 359.2, 359.3, 359.5, 359.6; 180/431; 33/645

(56) References Cited

U.S. PATENT DOCUMENTS

| | | | | |
|---|---|---|---|---|
| 3,430,993 A | * | 3/1969 | Leshinsky ................. | 403/359.6 |
| 3,556,273 A | * | 1/1971 | Paul Maucher ............. | 192/214 |
| 3,894,621 A | * | 7/1975 | Quick ..................... | 192/109 R |
| 3,923,409 A | * | 12/1975 | Stoner .................... | 403/290 |
| 4,098,096 A | * | 7/1978 | Chard et al. .............. | 464/89 |
| 4,357,137 A | * | 11/1982 | Brown ..................... | 464/75 |
| 4,641,853 A | * | 2/1987 | Specktor et al. .......... | 280/86.756 |
| 4,957,387 A | * | 9/1990 | Nasu ...................... | 403/322.2 |
| 5,119,898 A | * | 6/1992 | Eckhardt et al. ........... | 180/422 |
| 5,437,350 A | * | 8/1995 | Sallez et al. .............. | 180/287 |
| 5,503,494 A | * | 4/1996 | Kamata et al. ........... | 403/359.6 |
| 5,660,591 A | * | 8/1997 | Reynolds ................... | 464/88 |
| 6,164,698 A | * | 12/2000 | Gotoh ..................... | 280/771 |
| 6,514,003 B2 | * | 2/2003 | Horikawa ................. | 403/359.2 |
| 6,557,433 B1 | * | 5/2003 | Castellon ................. | 74/492 |
| 2002/0121748 A1 | * | 9/2002 | Ignatius et al. ........... | 280/5.511 |

* cited by examiner

Primary Examiner—Paul N. Dickson
Assistant Examiner—Laura B. Rosenberg
(74) Attorney, Agent, or Firm—Laura C. Hargitt

(57) ABSTRACT

A steering wheel alignment system for a vehicle includes an outer shaft for operative connection to a steering unit and an inner shaft for operative connection to a steering wheel. The steering wheel alignment system also includes a coupling disposed between the inner shaft and outer shaft to allow engagement and disengagement between the steering wheel and the steering unit for alignment of the steering wheel with wheels of the vehicle.

12 Claims, 4 Drawing Sheets

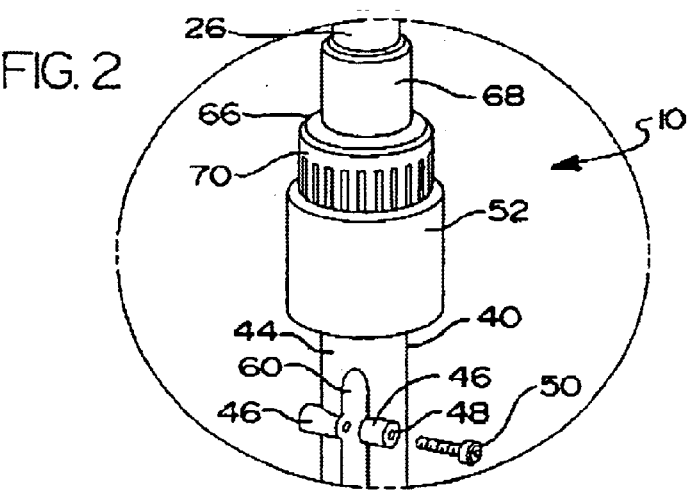
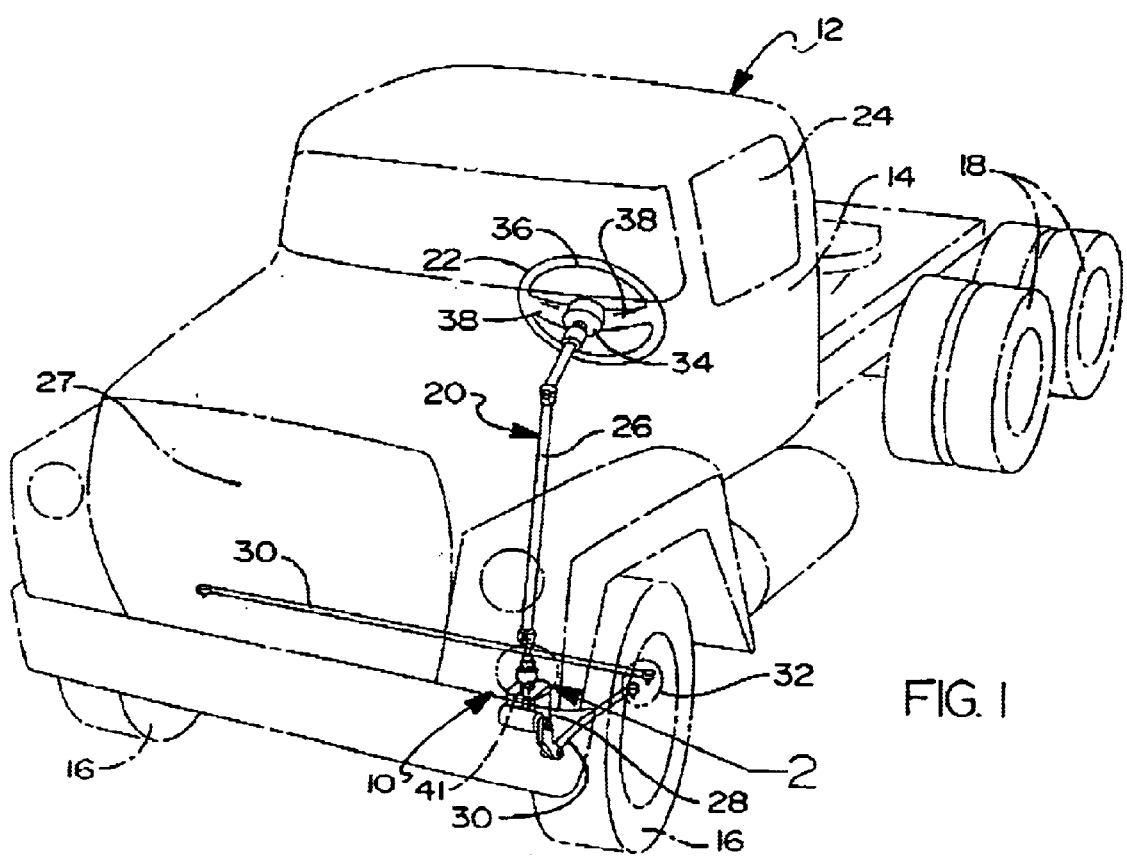

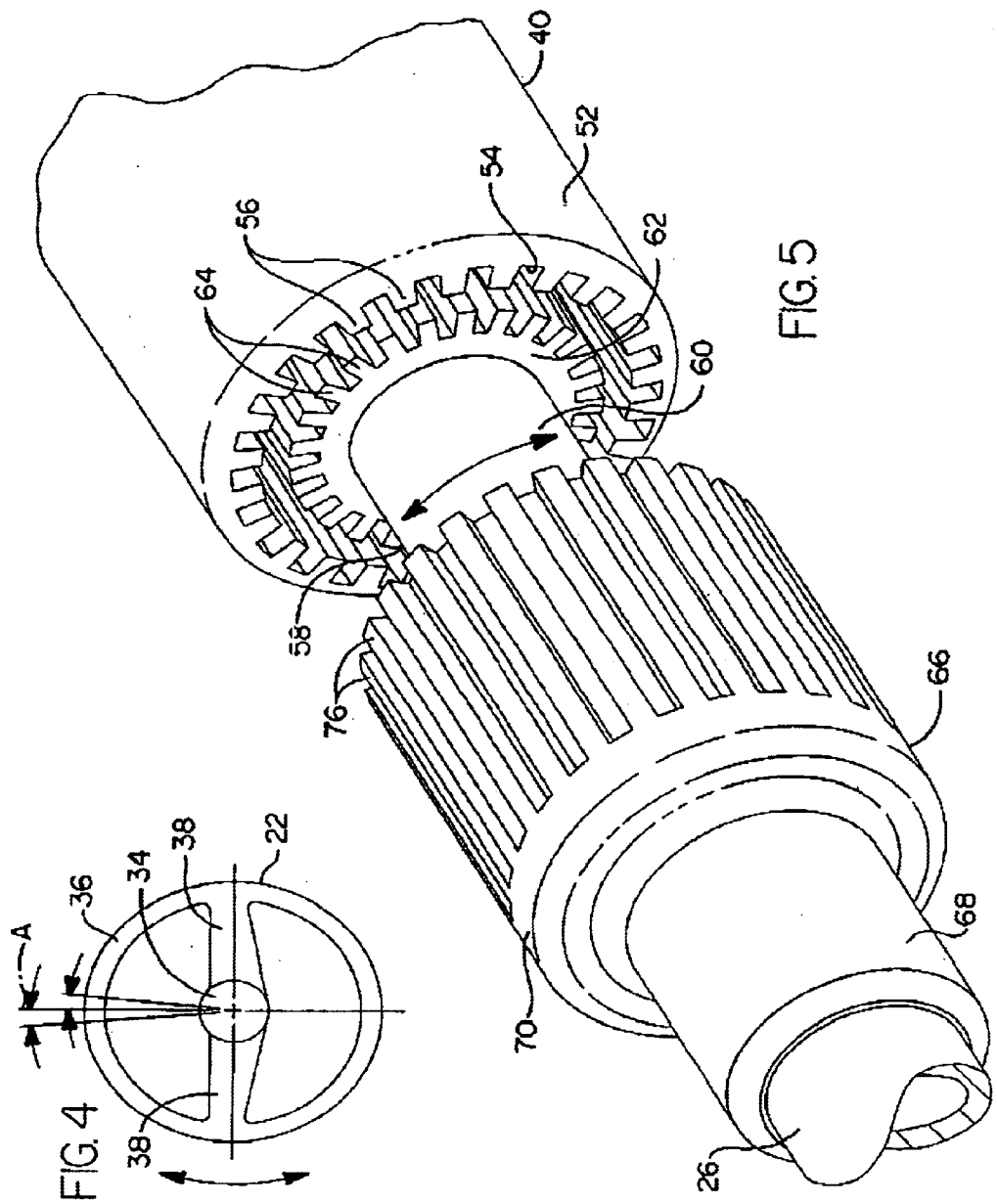

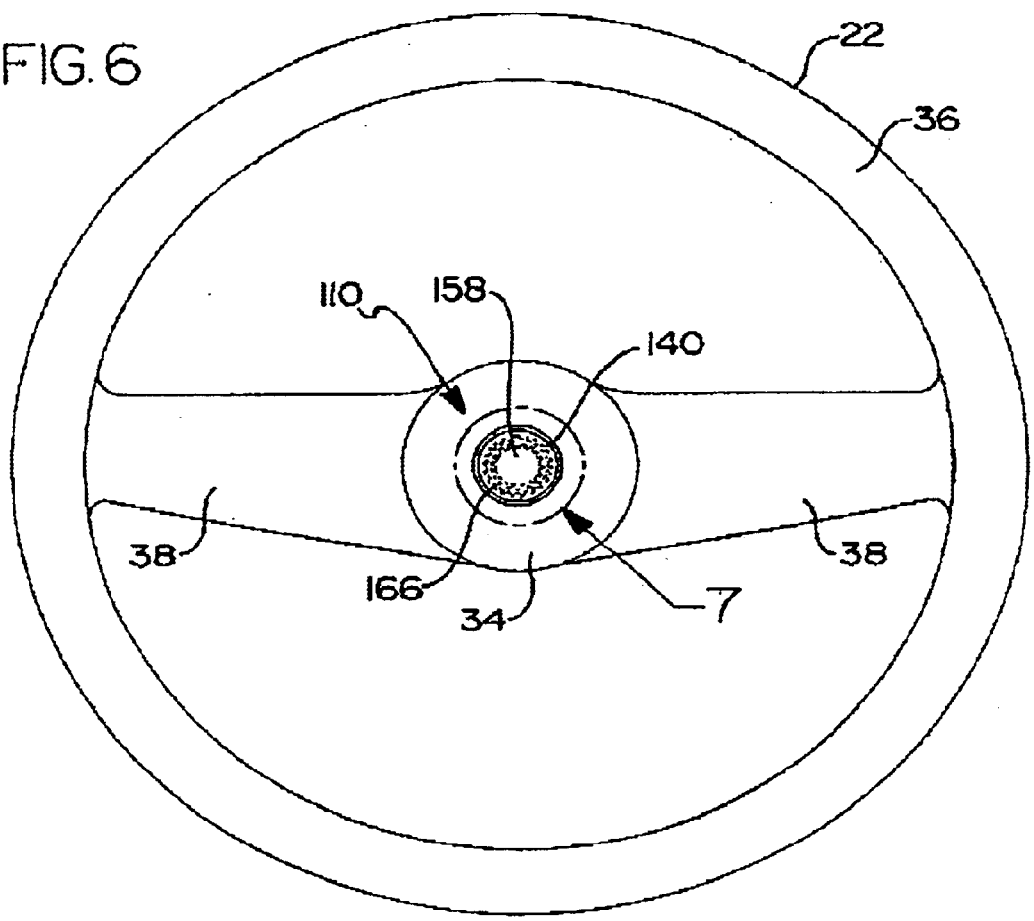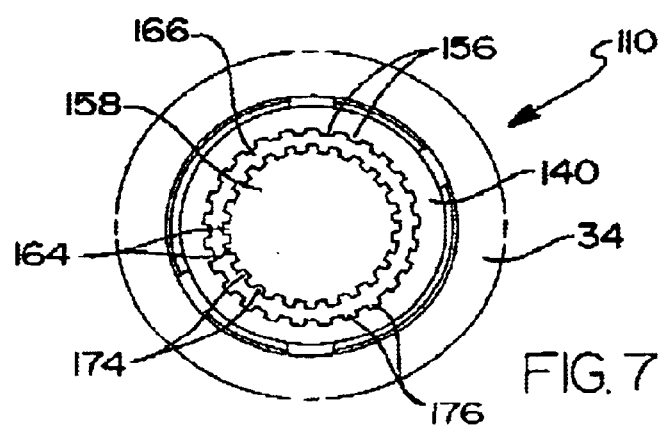

STEERING WHEEL ALIGNMENT SYSTEM

TECHNICAL FIELD

The present invention relates generally to steering systems for vehicles and, more particularly, to a steering wheel alignment system for a steering system of a vehicle.

BACKGROUND OF THE INVENTION

It is known to provide a steering system for a vehicle to allow a driver to steer wheels of the vehicle. In a vehicle such as a truck, the steering system typically includes a steering wheel, a steering shaft connected to the steering wheel, a steering unit connected to the steering shaft and one or more members such as a tie rods connected to the steering unit and a wheel knuckle for the wheel. The steering wheel typically includes a hub connected to the steering shaft, an outer rim spaced from and surrounding the hub, and a plurality of spokes interconnecting the hub and rim.

In most vehicles, when the wheels are aligned straight, the steering wheel is oriented such that the spokes of the steering wheel are generally horizontal in a home or neutral position. Setting the steering alignment usually results in the steering wheel being turned away from the home or neutral position. If this deviation is more than about three degrees, however, it is found to be objectionable. As a result, a complex adjustment of the steering system is undertaken by adjusting tie rod lengths or drag links to realign or center the steering wheel in the home or neutral position, which is time consuming and costly.

Therefore, it is desirable to provide a mechanism to allow alignment of the steering wheel to the home or neutral position without affecting the steering system. It is also desirable to provide a disconnect between the steering unit and the steering wheel for alignment of the steering wheel relative to the wheels. It is further desirable to provide a mechanism for precise alignment of the steering wheel relative to the wheels and vehicle, which is relatively simple and inexpensive. Thus, there is a need in the art to provide a steering wheel alignment system that meets these desires.

SUMMARY OF THE INVENTION

It is, therefore, one object of the present invention to provide a steering wheel alignment system for a vehicle.

It is another object of the present invention to provide a steering wheel alignment system that allows quick and easy alignment of the steering wheel relative to the wheels of a vehicle.

To achieve the foregoing objects, the present invention is a steering wheel alignment system for a vehicle. The steering wheel alignment system includes an outer shaft for operative connection to an input shaft of a steering unit and an inner shaft for operative connection to a steering wheel. The steering wheel alignment system also includes a coupling disposed between the inner shaft and outer shaft to allow engagement and disengagement and precise alignment between the steering wheel and steering unit for alignment of the steering wheel with wheels of the vehicle.

One advantage of the present invention is that a steering wheel alignment system is provided for a vehicle. Another advantage of the present invention is that the steering wheel alignment system allows alignment of the steering wheel without affecting the suspension/steering system and wheel alignment by allowing a disconnect between the steering unit and the steering wheel. Yet another advantage of the present invention is that the steering wheel alignment system allows an inexpensive alignment of the steering wheel at vehicle build and during vehicle servicing. Still another advantage of the present invention is that the steering wheel alignment system enhances production, performance, and quality. A further advantage of the present invention is that the steering wheel alignment system is quick and easy to use and allows for proper alignment of all steering components and for coupling them precisely.

Other objects, features, and advantages of the present invention will be readily appreciated, as the same becomes better understood, after reading the subsequent description taken in conjunction with the accompanying drawings.

BRIEF DESCRIPTION OF THE DRAWINGS

FIG. 1 is a perspective view of a steering wheel alignment system, according to the present invention, illustrated in operational relationship with a vehicle.

FIG. 2 is an enlarged perspective view of the steering wheel alignment system in circle 2 of FIG. 1.

FIG. 4 is an elevational view of a steering wheel used in conjunction with the steering wheel alignment system of FIG. 1.

FIG. 5 is a partial exploded perspective view of the steering wheel alignment system of FIG. 1.

FIG. 6 is an elevational view of another embodiment, according to the present invention, of the steering wheel alignment system of FIG. 1 illustrated in operational relationship within a steering wheel of a steering system.

FIG. 7 is an enlarged perspective view of the steering wheel alignment system in circle 7 of FIG. 6.

DESCRIPTION OF THE PREFERRED EMBODIMENT

Figure 3:
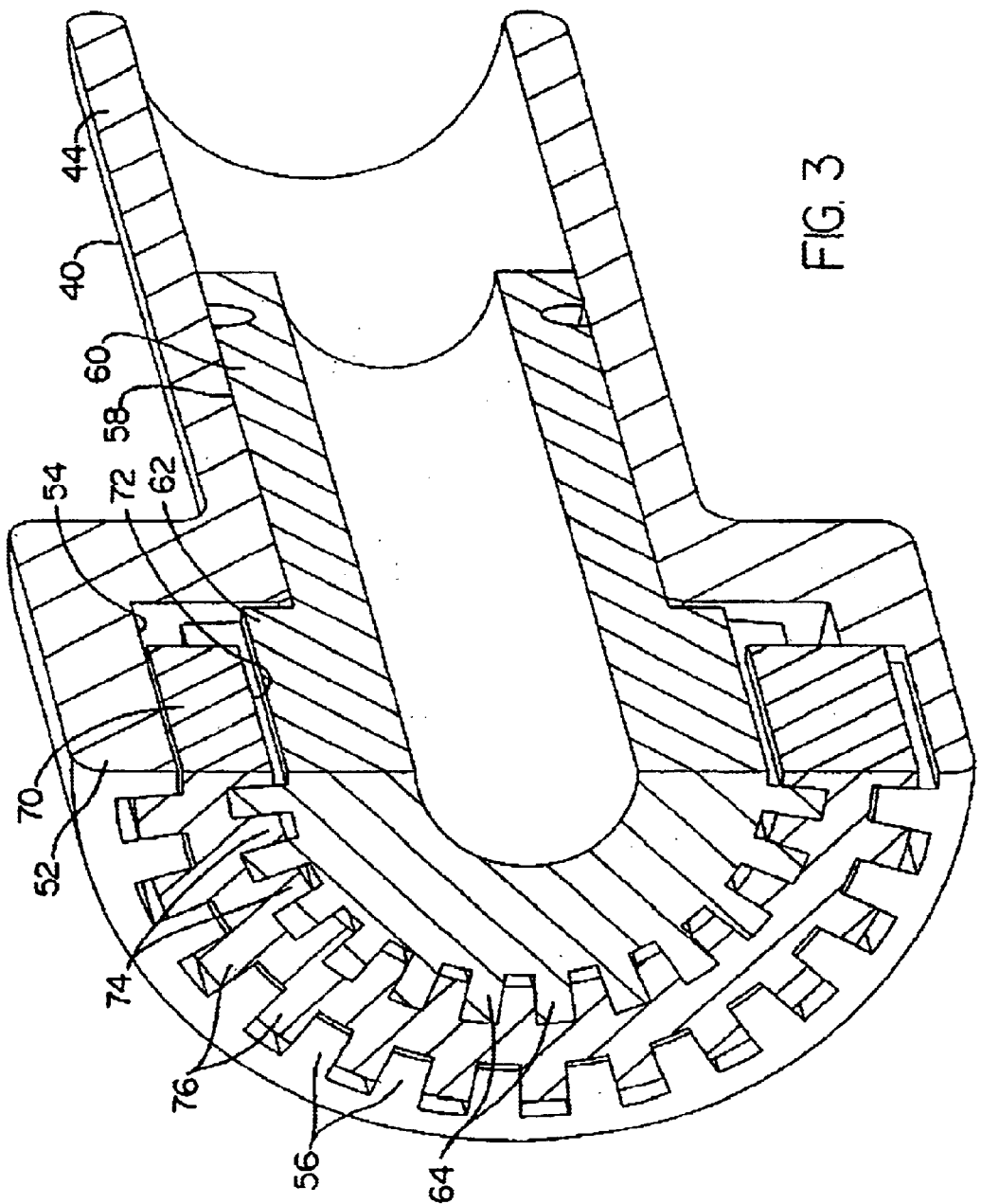
FIG. 3 is a fragmentary perspective view of the steering wheel alignment system of FIG. 1.

Referring to the drawings and in particular FIGS. 1 and 2, one embodiment of a steering wheel alignment system 10, according to the present invention, is shown for a vehicle, such as a motor vehicle, generally indicated at 12. The vehicle 12 is of a truck type and includes a vehicle body 14 (partially shown) and front wheels 16 and rear wheels 18 supporting the vehicle body 14. The vehicle 12 also includes a steering system, generally indicated at 20, to allow a driver (not shown) to steer the front wheels 16.

The steering system 20 includes a steering wheel 22 disposed in an occupant compartment 24 formed by the vehicle body 14 to be rotated by the driver of the vehicle 12. The steering system 20 also includes a steering shaft 26 connected to the steering wheel 22 and extending through the occupant compartment 24 into an engine compartment 27 for connection to the steering wheel alignment system 10. The steering system 20 includes a steering unit 28 disposed in the engine compartment 27 and connected to the steering wheel alignment system 10. The steering system 20 further includes one or more members 30 such as tie rods connected to the steering unit 28 and a wheel knuckle 32 for the front wheels 16. It should be appreciated that the steering unit 28 may be of a type such as power steering gear, manual steering gear, rack and pinion, or other steering systems. It should also be appreciated that the driver rotates the steering wheel 22 to rotate the steering shaft 26, in turn, rotating an input shaft of the steering unit 28 to move the members 30, in turn, moving or steering the wheel knuckle 32 and front wheels 16.

As illustrated in FIGS. 1 and 4, the steering wheel 22 typically includes an inner hub 34 connected to the steering shaft 26. The steering wheel 22 also includes an outer rim 36 spaced from and surrounding the hub 34 and a plurality of spokes 38 interconnecting the hub 34 and the outer rim 36. It should be appreciated that the two spokes 38, as illustrated in FIG. 4, are generally horizontal in a neutral or home position. It should also be appreciated that, except for the steering wheel alignment system 10, the vehicle 12 is conventional and known in the art.

Referring to FIGS. 1 through 3, the steering wheel alignment system 10, according to the present invention, includes an outer shaft 40 operatively connected to an input shaft 41 of the steering unit 28. The outer shaft 40 has a shaft portion 44 disposed over a shaft portion 60 of an inner shaft 58 to be described. The shaft portion 44 is generally tubular in shape with a generally circular cross-sectional shape. The shaft portion 44 may have a fastener portion 46 extending diametrically with a threaded passageway 48 to receive a fastener 50 such as a bolt. The fastener 50 threadably engages the threaded passageway 48 to cooperate with the shaft portion 60 of the inner shaft 58 to prevent axial movement but allow rotational movement therebetween. It should be appreciated that the shaft portion 44 may be operatively connected to the input shaft 41 either rigidly or through a flex coupling (not shown) to rotate the input shaft 41.

The outer shaft 40 also has an enlarged diameter end portion 52 at one end of the shaft portion 44. The end portion 52 is generally cylindrical in shape with a generally circular cross-sectional shape, but may have any other suitable shape. The end portion 52 has a cavity 54 extending axially therein. The end portion 52 also has a plurality, specifically a predetermined number, of internal projections or splines 56 disposed in the cavity 54 and spaced circumferentially thereabout for a function to be described. The splines 56 extend axially and are generally trapezoidal in shape with sides radiating from a circle coincident with a center of the shaft. In one embodiment, the predetermined number of splines is twenty-six (26). The outer shaft 40 is made of a rigid material such as metal, preferably steel. It should be appreciated that the outer shaft 40 operatively rotates the input shaft of the steering unit 28.

The steering wheel alignment system 10 also includes an inner shaft 58 operatively connected to the steering wheel 22 via the steering shaft 26. The inner shaft 58 has a shaft portion 60 disposed within the shaft portion 44 of the outer shaft 40. The shaft portion 60 is generally tubular in shape with a generally circular cross-sectional shape, but may have any suitable shape. The shaft portion 60 is connected to the steering shaft 26 by suitable means such as press fitting or welding. It should be appreciated that the inner shaft 58 rotates relative to the outer shaft 40 but is prevented from axial movement relative to the outer shaft 40 by the fastener portion 46 and fastener 50. It should also be appreciated that the shaft portion 60 may be operatively connected to the steering wheel 22 either rigidly or through a flex coupling (not shown) to rotate with the steering wheel 22.

The inner shaft 58 also has an enlarged diameter portion 62 on the shaft portion 60. The enlarged diameter portion 62 is generally cylindrical in shape with a generally circular cross-sectional shape. The enlarged diameter portion 62 has a plurality, specifically a predetermined number, of external projections or splines 64 extending radially therefrom and spaced circumferentially thereabout for a function to be described. The splines 64 are generally trapezoidal in shape and extend axially. In one embodiment, the predetermined number of splines 64 is twenty-seven (27). The inner shaft 58 is made of a rigid material such as metal, preferably steel. It should be appreciated that the inner shaft 58 may be rotated by the steering shaft 26.

The steering wheel alignment system 10 further includes a coupling 66 disposed between and interconnecting the inner shaft 58 and outer shaft 40. The coupling 66 has a shaft portion 68 disposed over the shaft portion 60 of the inner shaft 58. The shaft portion 68 is generally tubular in shape with a generally circular cross-sectional shape. The shaft portion 68 may be secured, after assembly, to the inner shaft 58 by suitable means (not shown) such as a fastener. It should be appreciated that the shaft portion 68 may be secured, after assembly, to the inner shaft 58 by other suitable means (not shown) such as a clamp.

The coupling 66 also has an enlarged diameter end portion 70 at one end of the shaft portion 68. The end portion 70 is generally cylindrical in shape with a generally circular cross-sectional shape, but may have any suitable shape. The end portion 70 has a cavity 72 extending axially therein. The end portion 70 also has a plurality, specifically a predetermined number, of internal projections or splines 74 disposed in the cavity 72 and spaced circumferentially thereabout for a function to be described. The splines 74 are generally trapezoidal in shape and extend axially. In one embodiment, the predetermined number of splines 74 is twenty-seven. The end portion 70 also has a plurality, specifically a predetermined number, of external projections or splines 76 extending radially therefrom and spaced circumferentially thereabout for a function to be described. The splines 76 are generally trapezoidal in shape and extend axially. In one embodiment, the predetermined number of splines 76 is twenty-six (26). The coupling 66 has a differential predetermined number of teeth between the internal splines 74 and the external splines 76. In one embodiment, the coupling 66 may have a one-tooth difference between the internal splines 74 and the external splines 76 to allow engagement within one full rotation of the coupling 66. In another embodiment, the coupling 66 may have a two tooth difference between the internal splines 74 and the external splines 76 to allow engagement within one half rotation of the coupling 66. It should be appreciated that the tooth differential of the coupling 66 provides the adjustability and alignment between the steering wheel 22 and steering unit 28. It should also be appreciated that a larger number of splines may be used to decrease the rotational requirement of the coupling 66 and provide more precise steering alignment.

The coupling 66 is made of a rigid material such as metal, preferably steel. It should be appreciated that the coupling 66 is rotated by the inner shaft 58, which in turn, rotates the outer shaft 40. It should also be appreciated that the steering wheel alignment system 10 may be located at any suitable place along a linkage of the steering system 20 between the steering unit 28 and the steering wheel 22. It should also be appreciated that the steering wheel alignment system 10 may be incorporated in the steering wheel 22, steering unit 28, or other components of the steering system 20.

In operation of the steering wheel alignment system 10, when the front wheels 16 of the vehicle 12 are aligned, the outer shaft 40 is fixed to the input shaft of the steering unit 28 and will now turn with the input shaft. The coupling 66 is assembled onto the inner shaft 58 and the inner shaft 58 is rigidly attached to the steering shaft 26 and will now turn with the steering wheel 22. The steering column and shaft assembly can now be installed onto the vehicle 12 by inserting the inner shaft 58 into the outer shaft 40. The coupling 66 is rotated until it slides into place between the differentially toothed inner and outer splines 56 and 64, respectively.

As illustrated in FIG. 4, if the steering wheel 22 deviates from the home or neutral position A on either side thereof by a predetermined angle such as three degrees when the front wheels 16 are straight, the steering wheel alignment system 10 may be adjusted. In this condition, the coupling 66 is loosened and slid axially to disengage the inner and outer splines 56 and 64. The steering wheel 22 is then rotated to the home or neutral position A such that the spokes 38 are generally horizontal with the front wheels 16 straight. The coupling 66 is rotated until it slides into place between the inner and outer splines 56 and 64. The coupling 66 is then tightened and fixed in place.

Alternatively, during assembly of the vehicle 12, the front wheels 16 of the vehicle 12 are aligned correctly first. The steering column (not shown) is then assembled to the vehicle 12 and the steering wheel 12 is aligned correctly in the home or neutral position. The coupling 66 is rotated until it slides into place between the inner and outer splines 56 and 64. The coupling 66 is then tightened and fixed in place.

Referring to FIGS. 6 and 7, another embodiment, according to the present invention, of the steering wheel alignment system 10 is shown. Like parts of the steering wheel alignment system 10 have like reference numerals increased by one hundred (100). In this embodiment, the steering wheel 22 typically includes an inner hub 34 connected to the steering shaft 26. The steering wheel 22 also includes an outer rim 36 spaced from and surrounding the hub 34 and a plurality of spokes 38 interconnecting the hub 34 and the outer rim 36. The steering wheel alignment system 110 includes the outer shaft 140 operatively connected to hub 34 of the steering wheel 22. The steering wheel alignment system 110 also includes the inner shaft 158 operatively connected to the steering shaft 26. The steering wheel alignment system 110 further includes the coupling 166 disposed between and interconnecting the inner shaft 158 and outer shaft 140. The coupling 166 has internal splines 174 and external splines 176 and is rotated until the splines 174 and 176 slide into place between the differentially toothed inner and outer splines 156 and 164, respectively. It should be appreciated that the operation of the steering wheel alignment system 110 is similar to the steering wheel alignment system 10. It should also be appreciated that the internal and external splines 174 and 176 must match the splines 156 and 164 on the engaging components.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A steering wheel alignment system for a vehicle comprising:

a steering wheel;

a steering unit;

an outer shaft operatively connected to said steering unit;

an inner shaft operatively connected to said steering wheel; and a coupling disposed between said inner shaft and said outer shaft to allow engagement and disengagement between said steering wheel and said steering unit for alignment of said steering wheel with wheels of the vehicle;

wherein said coupling has a shaft portion extending axially and an enlarged diameter end portion extending from said shaft portion and has a cavity extending axially in said end portion;

wherein said coupling includes a plurality of internal splines disposed in said cavity and spaced circumferentially thereabout.

2. A steering wheel alignment system as set forth in claim 1 wherein said coupling includes a plurality of external splines disposed on said enlarged diameter end portion and spaced circumferentially thereabout, said external splines and said internal splines being different in number.

3. A steering wheel alignment system for a vehicle having a steering system comprising:

a steering wheel;

a steering unit having an input shaft;

an outer shaft operatively connected to said input shaft of said steering unit and having a plurality of first internal splines;

an inner shaft operatively connected to said steering wheel and having a plurality of first external splines; and a coupling having a plurality of second external splines cooperating with said first internal splines and a plurality of second internal splines cooperating with said first external splines to allow engagement and disengagement between said steering wheel and said steering unit for alignment of said steering wheel with wheels of the vehicle.

4. A steering wheel alignment system as set forth in claim 3 wherein said outer shaft has a shaft portion extending axially and an enlarged diameter end portion extending from said shaft portion.

5. A steering wheel alignment system as set forth in claim 4 wherein said outer shaft has a cavity extending axially in said end portion.

6. A steering wheel alignment system as set forth in claim 5 wherein said first internal splines are disposed in said cavity and spaced circumferentially thereabout.

7. A steering wheel alignment system as set forth in claim 3 wherein said inner shaft has a shaft portion extending axially and an enlarged diameter portion extending from said shaft portion.

8. A steering wheel alignment system as set forth in claim 7 wherein said first external splines are disposed on said enlarged diameter portion and spaced circumferentially thereabout.

9. A steering wheel alignment system as set forth in claim 3 wherein said coupling has a shaft portion extending axially and an enlarged diameter end portion extending from said shaft portion.

10. A steering wheel alignment system as set forth in claim 9 wherein said coupling has a cavity extending axially in said end portion, said second internal splines being disposed in said cavity and spaced circumferentially thereabout and said second external splines being disposed on said enlarged diameter end portion and spaced circumferentially thereabout.

11. A steering wheel alignment system as set forth in claim 3 wherein said second external splines and said second internal splines are different in number.

12. A steering system for a vehicle comprising:

a steering wheel;

a steering unit having an input shaft;

an outer shaft operatively connected to said input shaft, wherein said outer shaft has a first shaft portion extending axially, an enlarged diameter first end portion extending from said first shaft portion, a cavity extending axially in said first end portion, and a plurality of first internal splines disposed in said first cavity and spaced circumferentially thereabout;

an inner shaft operatively connected to said steering wheel, wherein said inner shaft has a second shaft portion extending axially, an enlarged diameter portion extending from said second shaft portion, and a plurality of first external splines disposed on said enlarged diameter portion and spaced circumferentially thereabout; and a coupling disposed between said inner shaft and said outer shaft, wherein said coupling has a third shaft portion extending axially, an enlarged diameter second end portion extending from said third shaft portion, a second cavity extending axially in said second end portion, a plurality of second internal splines disposed in said second cavity and spaced circumferentially thereabout and cooperating with said first external splines, and a plurality of second external splines disposed on said second end portion and spaced circumferentially thereabout and cooperating with said first internal splines, said second external splines and said second internal splines being different in number to allow engagement and disengagement between said steering wheel and said steering unit for alignment of said steering wheel with wheels of the vehicle.

* * * * *